No. 889,968. PATENTED JUNE 9, 1908.
W. E. RICKEY.
COTTON HARVESTER.
APPLICATION FILED JUNE 15, 1907.
2 SHEETS—SHEET 1.
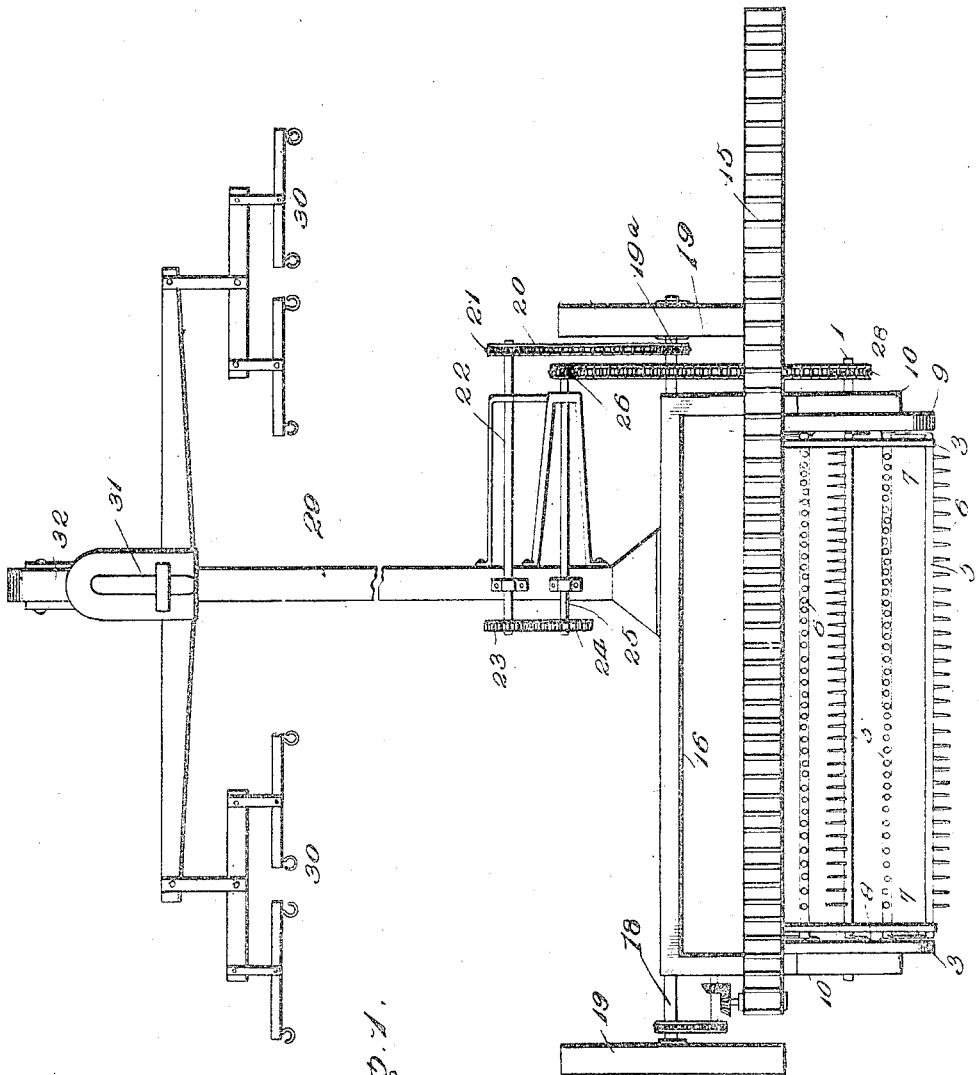

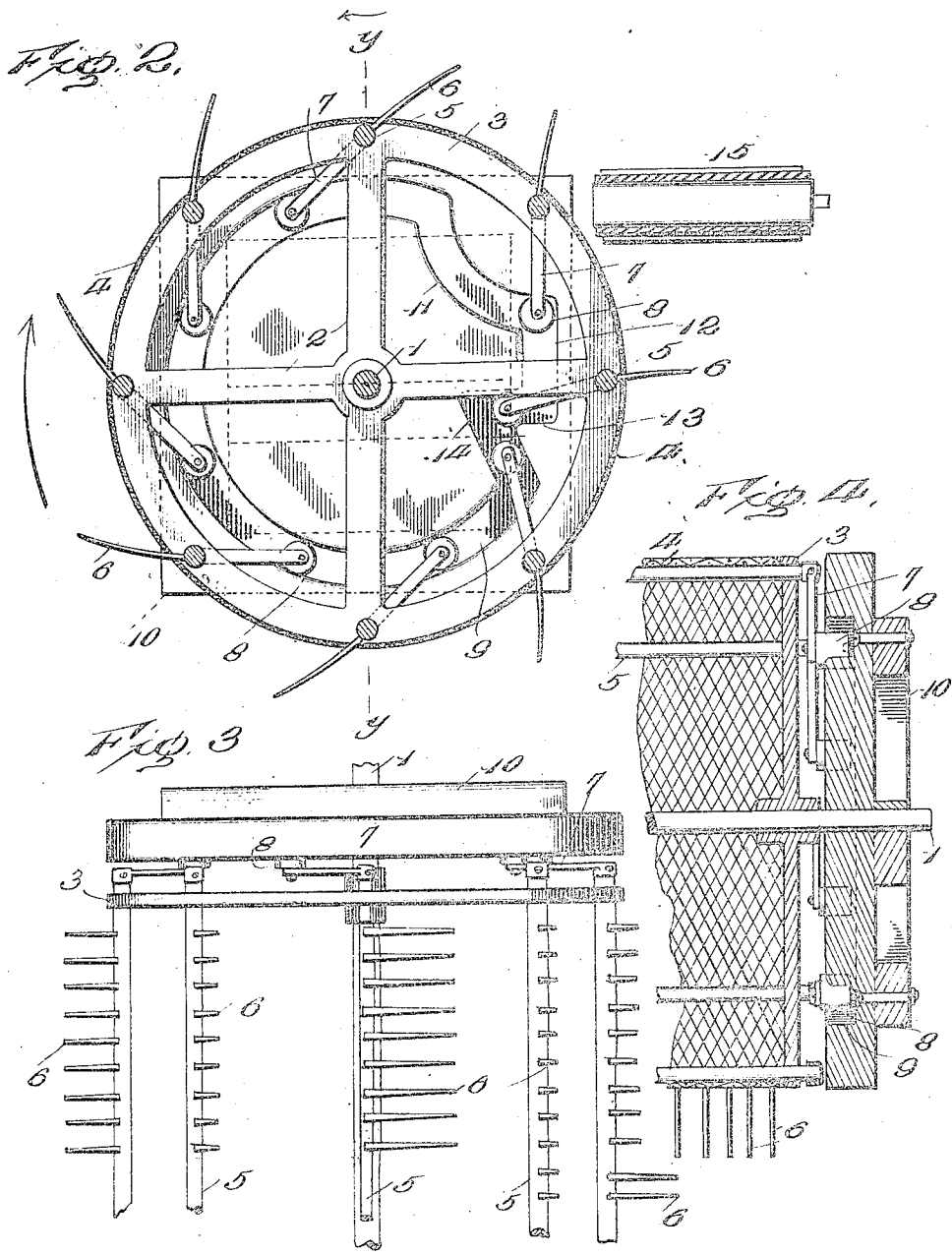

UNITED STATES PATENT OFFICE.

WILLIAM E. RICKEY, OF ROCKY, OKLAHOMA.

COTTON-HARVESTER.

No. 889,968.  Specification of Letters Patent.  Patented June 9, 1908.

Application filed June 15, 1907. Serial No. 379,208.

*To all whom it may concern:*

Be it known that I, WILLIAM E. RICKEY, citizen of the United States, residing at Rocky, in the county of Washita, Oklahoma, have invented certain new and useful Improvements in Cotton-Harvesters, of which the following is a specification.

This invention comprehends certain new and useful improvements in cotton harvesters, and the invention has for its object an improved construction of revolving cylinder adapted to be carried over the fields and revolved upwardly and rearwardly from the ground, as it travels forwardly, so as to strip the cotton and bolls from the stalks and deliver the same over the upper and rear end of the cylinder, for instance, upon a transversely traveling conveyer which may carry the cotton and bolls to any receptacle.

The invention consists in certain constructions, arrangements and combinations of the parts that I shall hereinafter fully describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a plan view of my cotton harvesting machine the casing or body portion of the cylinder being omitted; Fig. 2 is a transverse sectional view of the cylinder; Fig. 3 is a plan view of one end of the cylinder; and, Fig. 4 is a vertical sectional view thereof.

Corresponding and like parts are referred to in the following description and indicated in all the views of the drawings by the same reference characters.

My invention comprehends a cotton harvesting cylinder which embodies a driving and supporting shaft 1 extending horizontally, as shown, spiders or radial arms 2 secured in spaced relation on the said shaft or axis, and circular heads 3 secured to the ends of said arms or spiders, the body of the cylinder between said heads being preferably formed of wire mesh or similar foraminous or reticulated material 4.

5 designates a series of transversely extending rods journaled at their ends in the heads 3, to turn about their longitudinal axes, any desired number of said rods being employed and spaced at any predetermined or desired intervals around the body of the cylinder. Each one of these rods 5 carries a series of stalk stripping fingers 6, as clearly illustrated in the drawings, said fingers or teeth 6 being of any desired length and number. A pair of arms 7 is connected to each rod 5, preferably at the ends thereof, and the ends of said arms 7 carry rollers 8 adapted to travel in the partially circular, and partially circuitous or cam-like track-ways 9 held in a stationary manner by the framework 10 at the ends of the cylinder. As clearly illustrated in Fig. 2, each of these track-ways embodies near the rear side of the cylinder a reversely curved portion 11 which merges at one end into a straight vertical portion 12. This latter portion merges at its lower end to an inwardly extending portion 13 disposed at right angles to the portion 12, said portion 13 in turn communicating with an outwardly and downwardly inclined portion 14 which communicates with the other end of the major circular portion of the track-way. By means of this peculiar formation of trackway, it will be seen by reference to the drawings that the several series of teeth or fingers 6 will be held in a position forward or in advance of the several radii extending through their inner or supporting rod ends, as the cylinder rotates in the direction of the dart in Fig. 2. This position is maintained, so long as the rollers 8 are traveling in the circular portion of the track-ways 9, it being noted that such circular portions are concentric with the cylinder and that the arms 7 are longer than the distance between the cylinder and the circular portions of the trackways, so that the rollers 8 will drag behind their respective rods 5 and cause the several series of teeth or fingers 6 to assume such a position that they will properly sweep upwardly and forwardly through the cotton stalks and strip the cotton and bolls from the stalks, as the cylinder is transported over the field.

In order that the stripping fingers or teeth 6 may clear the framework of the transversely traveling conveyer 15, or other framework, as they come to the rear portion of the cylinder in their traverse, the irregular portions 11, 12, 13 and 14 of the track-ways are provided, it being noted, as illustrated in Fig. 2, that such portions of the track-ways will have the following effect: first, the reverse portions 11 will tilt the series of teeth transversely upward, so as to clear the framework; second, the straight portions 12 will hold the teeth upright as they descend far enough to clear the framework; the next and inwardly extending portions 13 of the track-ways will tilt the teeth downwardly; and the next and rearwardly and downwardly inclined portions 14 will tilt the arms 7 sharply in an upward direction so as to reverse the position of the parts and prepare the series of teeth for resuming their forwardly inclined position, just as they begin to sweep upwardly through the growing plants.

It is to be understood that my improved cotton harvesting cylinder may be carried on any suitable framework and be operated in any desired manner. In the present instance, for the purposes of illustration, I have shown at the rear of the cylinder the laterally transverse conveyer 15 actuated by any suitable means, (not shown) and adapted to convey the cotton in the bolls to any desired receptacle. The framework 16 of this conveyer, as well as the framework of the harvesting cylinder may be carried upon a wheeled truck having a front axle 18 with traveling wheels 19. One of the traveling wheels may be provided with a sprocket wheel 19ª connected by a chain 20 to a similar wheel 21 on the shaft 22 journaled in the framework and extending transversely thereof. A gear wheel 23 may be mounted on this shaft 22, said gear wheel meshing with a similar wheel 24 on the countershaft 25. The counter-shaft 25 may carry a sprocket wheel 26 connected by the sprocket chain 27 with the sprocket wheel 28 on the shaft 1, so as to drive the cylinder.

29 designates a draft beam which may be provided with a swingle-tree 30 and which may guide the machine by means of the steering bar or rod 31 to which the rear traveling and steering or colter wheel 32 is secured.

From the foregoing description in connection with the accompanying drawings, it will be seen that I have provided a very simple, durable and efficient construction of cotton harvesting cylinder which will effectually strip the cotton and bolls from the cotton stalks as the machine is driven over the fields by an effectively arranged series of stalk stripping devices embodying the rods 5, the teeth or fingers 6, the arms 7 and rollers 8 and the track-ways 9, the several portions of which conact to produce the desired movement of the stripping teeth.

By the use of wire mesh for the body portion or cover of the harvester cylinder, fine dirt and trash will be allowed to fall through and be separated when the cotton is gathered, while a solid cover would not perform this function and would be obviously very much heavier. The wire mesh body portion effectually prevents cotton from being thrown loose from the teeth and being dropped through between the rods and serve the additional function, as above stated, of screening the fine dirt and trash from the cotton.

Having thus described the invention, what is claimed as new is:

1. In a cotton harvester, the combination of a horizontally disposed revoluble cylinder, a support therefor, means for rotating said cylinder, a series of shafts mounted in said cylinder, for a partial turning movement relative thereto, a series of stalk stripping teeth carried by each of said shafts, arms secured to the respective shafts, rollers carried by said arms, track-ways and supports therefor, said track-ways having circular portions concentric with the cylinder and other portions, one of which curves reversely from one end of the cylindrical portion and thence extends downwardly and again inwardly, and finally downwardly and rearwardly and communicates with the other end of the cylindrical portion.

2. In a cotton harvester, a stalk stripping cylinder, consisting of a supporting and actuating shaft, circular heads carried thereby, and a reticulated body portion, a series of rods journaled in said heads to turn about their longitudinal axes, a series of stalk stripping teeth carried by each of said rods, track-ways mounted within the ends of the cylinder, a support for said track-ways, arms secured to the respective rods, and rollers carried by said arms and having movement in said track-ways.

3. In a cotton harvester, the combination of a horizontally-disposed revoluble cylinder, a support on which said cylinder is mounted, means for rotating said cylinder, a series of rods mounted in said cylinder for a partial turning movement relative thereto, stalk stripping teeth carried by said rods, arms secured to the respective rods, and stationary track-ways and supports therefor, said track-ways having circular portions concentric with the cylinder and other portions, one of which curves reversely from one end of the cylindrical portion and thence extends downwardly and again inwardly and finally downwardly and rearwardly, and communicates with the other end of the cylindrical portion, said arms being guided in said track-way and being longer than the distance between the track-ways and the cylinder, as and for the purpose set forth.

4. In a cotton harvester, the combination of a horizontally-disposed revoluble cylinder, a support therefor, means for rotating said cylinder, a series of rods mounted in said cylinder for a partial turning movement relative thereto, a series of stalk stripping teeth carried by each of said rods, a transversely extending conveyer mounted in the rear of the cylinder and close to the same near the upper plane thereof, means for holding said rods with the teeth projecting from the cylinder, and means for automatically turning said rods in a direction to throw the teeth sharply upwardly and hold them in a vertical position when passing the conveyer and for restoring the rods to normal position.

5. In a cotton harvester, a stalk stripping cylinder comprising a supporting and actuating shaft, circular heads carried thereby and a reticulated body portion, a series of rods mounted in said heads, and stalk stripping teeth carried by said rods and projecting out through the body of said cylinder.

In testimony whereof I affix my signature in presence of two witnesses.

WILLIAM E. RICKEY. [L. S.]

Witnesses:
GEORGE W. MILLER,
HUGH A. FOX.